US012766924B2

(12) United States Patent
Delcourt et al.

(10) Patent No.: US 12,766,924 B2
(45) Date of Patent: Oct. 20, 2026

(54) ELECTRIC RADIATOR WITH TEMPERATURE MEASUREMENT DEVICE

(71) Applicant: Valeo Systemes Thermiques, Le Mesnil Saint-Denis (FR)

(72) Inventors: Romain Delcourt, Le Mesnil Saint-Denis (FR); Théo Deletang, Le Mesnil Saint-Denis (FR); Pascal Fourgous, Le Mesnil Saint-Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 754 days.

(21) Appl. No.: 17/779,191

(22) PCT Filed: Nov. 10, 2020

(86) PCT No.: PCT/FR2020/052048
§ 371 (c)(1),
(2) Date: May 24, 2022

(87) PCT Pub. No.: WO2021/105581
PCT Pub. Date: Jun. 3, 2021

(65) Prior Publication Data

US 2022/0402334 A1 Dec. 22, 2022

(30) Foreign Application Priority Data

Nov. 27, 2019 (FR) ...................................... 1913351

(51) Int. Cl.
*B60H 1/22* (2006.01)
*B60H 1/00* (2006.01)
(Continued)

(52) U.S. Cl.
CPC ....... *B60H 1/2225* (2013.01); *B60H 1/00521* (2013.01); *B60H 2001/2256* (2013.01);
(Continued)

(58) Field of Classification Search
CPC .............. B60H 1/2225; B60H 1/00521; B60H 2001/2256; F24H 3/0429; H05B 2203/023; G01K 1/14
(Continued)

(56) References Cited

U.S. PATENT DOCUMENTS 6,328,468 B1 * 12/2001 Nagano .................... F24F 11/30 374/208
2006/0162350 A1 * 7/2006 Shiraishi ................. F25B 39/02 62/515
(Continued)

FOREIGN PATENT DOCUMENTS

CN 1854636 A 11/2006
CN 205385687 U 7/2016
(Continued)

OTHER PUBLICATIONS

Machine Translation of EP2772375 (Year: 2024).*
(Continued)

*Primary Examiner* — John J Norton
*Assistant Examiner* — Thomas J Ward
(74) *Attorney, Agent, or Firm* — Osha Bergman Watanabe & Burton LLP

(57) ABSTRACT

The present invention relates to an electric radiator (1) for a ventilation, heating and/or air conditioning system, comprising a heating body (2), an electrical connection interface (3) and at least one temperature measurement device (4) arranged across an air flow (6) that is able to pass through the heating body (2) and comprising at least one temperature sensor (41) and a body (42) for supporting the temperature sensor (41) extending in a transverse direction remote from the heating body (2), characterized in that the temperature measurement device (4) is electrically connected to the electrical connection interface (3) of the radiator (1) through
(Continued)

Figure 1:
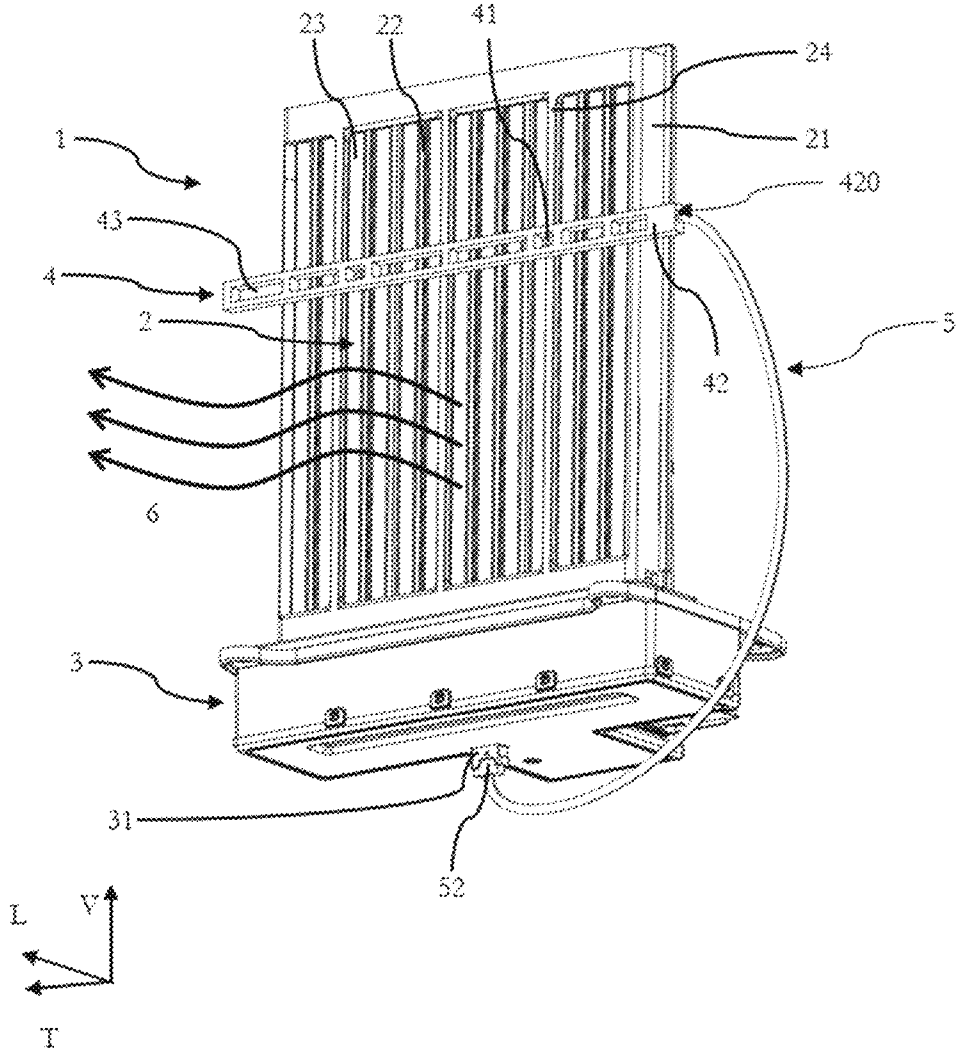

a connection cable (5) that extends from a transverse end (420) of the body (42) for supporting the temperature sensor.

10 Claims, 6 Drawing Sheets

(51) Int. Cl.
*F24H 3/04* (2022.01)
*G01K 1/14* (2021.01)

(52) U.S. Cl.
CPC .............. *F24H 3/0429* (2013.01); *G01K 1/14* (2013.01); *H05B 2203/023* (2013.01)

(58) Field of Classification Search
USPC .......................................................... 392/360
See application file for complete search history.

(56) References Cited

U.S. PATENT DOCUMENTS

| | | | | |
|---|---|---|---|---|
| 2009/0296782 | A1* | 12/2009 | Nishiyashiki | G01K 1/14 374/208 |
| 2014/0319114 | A1 | 10/2014 | Gong et al. | |

FOREIGN PATENT DOCUMENTS

| | | | | | |
|---|---|---|---|---|---|
| DE | 19918906 | A1 | | 11/2000 | |
| EP | 2056036 | A1 | | 5/2009 | |
| EP | 2772375 | A1 | * | 9/2014 | G05D 23/20 |
| EP | 2772820 | A1 | | 9/2014 | |
| WO | 2005/042284 | A1 | | 5/2005 | |
| WO | 2005/049350 | A1 | | 6/2005 | |
| WO | WO-2018189302 | A1 | * | 10/2018 | A01K 51/00 |

OTHER PUBLICATIONS

Machine Translation of EP2772375A1 (Year: 2025).*
International Search Report and Written Opinion in corresponding International Application No. PCT/FR2020/052048, mailed Feb. 11, 2021 (13 pages).
Office Action issued in counterpart Chinese Patent Application No. 202080081157.5 mailed Sep. 13, 2024 (8 pages).

* cited by examiner

ELECTRIC RADIATOR WITH TEMPERATURE MEASUREMENT DEVICE

The present invention pertains to the field of ventilation, heating and/or air conditioning for motor vehicles and relates more particularly to an electric radiator of a ventilating, heating and/or air conditioning system of a vehicle.

It is known practice to use electric radiators within a ventilating, heating and/or air conditioning system of a vehicle. An electric radiator can for example be disposed across the path of an air flow in order to heat said air flow. Such a radiator has a heating body in which heating elements are disposed, for example by being housed in a support-forming frame, these heating elements being configured to be in contact with the air, where appropriate via radiant elements which increase the surface area for heat exchange between the hot surface and the traversing air, so as to promote an exchange of heat energy between the air and the heating elements.

In particular, these heating elements can include PTC, that is to say positive temperature coefficient, stones or ceramics. The supply of current to these resistive elements heats up the heating element and possibly transmits heat energy to an air flow brought into contact with this heating element.

In order to monitor the heating emanating from such a radiator, it is known practice to arrange temperature sensors in the path of the air flow at the outlet of the radiator. The temperature sensors make it possible for example to monitor the temperature of the air flow caused to be distributed subsequently in the passenger compartment and/or to detect whether a temperature threshold likely to damage certain heat-sensitive elements of the ventilating, heating and/or air conditioning system is exceeded, so as to regulate the operation of the radiator accordingly. The installation of the temperature sensor creates several problems. It is in particular desirable to dispose the temperature sensor some distance from the radiator so as not to take incorrect measurements of the temperature, and in particular measurements that are more representative of the temperature of the heating element than of the temperature of the air flow that has traversed the radiator, and the installation of the temperature sensor is therefore complicated, since it is necessary to ensure that the position of this sensor is indeed in accordance with the desired theoretical position. Furthermore, in terms of electrical connection, it is known practice to connect the temperature sensor to a control unit of the ventilating, heating and/or air conditioning system which is configured to send operating instructions to the radiator if necessary, but this involves for the one part a step of connecting the sensor to the control unit and for the other part an information processing time which is affected by the involvement of the control unit.

The present invention falls within this context by proposing an electric radiator for a ventilating, heating and/or air conditioning system of a vehicle, comprising a heating body, an electrical connection interface, and at least one temperature measuring device disposed across an air flow able to traverse the heating body and comprising at least one temperature sensor and a support body for supporting said temperature sensor extending in a transverse direction some distance from the heating body, characterized in that the temperature measuring device is electrically connected to the electrical connection interface of the radiator by way of connection wiring which extends from a transverse end of the support body for supporting the temperature sensor.

The heating body of the radiator can for example have a rectangular overall shape defined by a frame provided with heating elements which generate heat, as well as radiant elements diffusing the flow of hot air leaving the radiator. The heating elements and the radiant elements form the heating body and can be held by a frame that surrounds them and by a grid that is integral with this frame and is arranged across the air flow. One end of the heating body is linked to the electrical connection interface. The latter makes it possible, among other things, to supply electrical energy to the heating elements, causing them to heat up.

The temperature measuring device is advantageously disposed facing a face of the heating body of the radiator, more specifically the face from which the flow of hot air emanates after it has passed through the heating body, or in other words the exit face of the heating body. The temperature measuring device therefore measures the temperature of the air flow leaving the heating body of the radiator. The temperature measuring device comprises one or more temperature sensors disposed on a support body for supporting the temperature sensor, which body is sized and configured to allow the temperature sensor(s) to be retained in the air flow and at the desired distance from the heating body. As will be set out below, in order to obtain relevant temperature measurements, that is to say measurements representative of the temperature of the air flow and not of the heating element closest to the sensor, it has been estimated that the temperature measuring device should be disposed at least 20 mm from the heating body of the radiator.

The temperature sensor can for example be an NTC sensor, in particular chosen for sensitivity to temperature variations. The support body for supporting the temperature sensor is a structure made of heat-resistant material housing the temperature sensor.

The support body extends mainly in a transverse direction of extension and the connection wiring extends from a transverse end of the support body, that is to say in the continuation of the support body at one of its transverse ends. Such a disposition of the connection wiring makes it possible to ensure that it is easy to install the electric radiator in an associated ventilating, heating and/or air conditioning system, with the support body and the temperature sensors facing the heating body, while still facilitating the sealing of the assembly once the electric radiator has been installed.

The connection wiring extends as far as the electrical connection interface of the radiator. The connection wiring and the electrical connection interface are connected for example by plugging said connection wiring into a connector of the electrical connection interface. Thus, if an excessively high temperature is measured by the temperature sensor, the information is directly transmitted to the electrical connection interface by way of the connection wiring, and causes the radiator to be cut off or the power of the heating elements of the heating body of the radiator to fall.

Directly linking the temperature measuring device to the electric radiator and in particular to its electrical connection interface allows the operation of the electric radiator to be self-regulated without an intermediate data transmission step.

Furthermore, disposing the connection wiring in the continuation of a transverse end of the support body allows the temperature measuring device to be mounted some distance from the heating body, by causing the connection wiring to run some distance from the heating body, and in particular by way of the outside of a housing of the ventilating, heating and/or air conditioning system, as will be described below.

According to one characteristic of the invention, the at least one temperature sensor has a sensor head housed in the support body and connection wires which link the sensor head to the connection wiring by extending in particular along channels formed in the support body. The connection wires extend within the structure of the support body for supporting the temperature sensor in order to be able to be connected to the latter. The connection wires are brought together, at the transverse end of the above-mentioned support body, to form the connection wiring and they contribute to holding, by being stretched in the channels, the sensor head in position across the air flow.

According to one characteristic of the invention, the temperature measuring device comprises a plurality of temperature sensors, the connection wires specific to each temperature sensor being grouped together to form the connection wiring at said transverse end of the support body. It may be advisable to dispose multiple temperature sensors along the support body in order to take the temperature of the air flow at multiple locations. This is because it is possible that the temperature of the air flow that is taken varies depending on the position of the temperature sensors. Therefore, the electrical connection interface, after having received the temperature measurements, can for example establish an average of the temperatures taken and act or not act accordingly, rather than relying only on a single temperature measurement taken by a single temperature sensor.

According to one characteristic of the invention, the support body for supporting the temperature sensor has a plurality of openings made between two transverse bars and uprights linking the transverse bars to one another, said openings making it possible to house the sensor head of the at least one temperature sensor and/or allowing the passage of the air flow traversing the heating body of the radiator. The openings pass all the way through the support body, on the faces perpendicular to the air flow emanating from the heating body of the radiator. Therefore, the air flow is able to pass through the support body by traversing the openings. The presence of openings makes it possible, over the entire transverse size of the support body, to not adversely affect the air flow circulation and to limit the pressure drops in the flow, while still reducing the weight of the support body and therefore of the electric radiator as a whole.

At least one of the openings is provided with a temperature sensor head, for example held by the connection wires to which the temperature sensor is connected. Therefore, the air flow also traverses the opening provided with the temperature sensor which can then measure the temperature of the air flow.

According to one characteristic of the invention, the channels housing the connection wires are respectively formed in one of the transverse bars on either side of the openings.

According to one characteristic of the invention, the support body is formed by the interaction of a base and a cover which are fitted against one another so as to form said channels.

According to one characteristic of the invention, the connection wiring is electrically linked to a low-voltage connector of the electrical connection interface, said connector being arranged on an external face of a cover plate of the electrical connection interface.

The electrical connection interface is divided into a high-voltage section and a low-voltage section. The high-voltage section is capable of supplying electrical power to 400 V, for example, this high-voltage section being intended to supply electrical power to the heating elements of the heating body of the radiator which may require a high energy input to heat up to high temperatures. It should be noted that a supply voltage of about 400 V or more is by contrast too high, or inappropriate for the connection of other electrical or electronic components such as the temperature sensor(s), which are at risk of being damaged if connected to the high-voltage section, for example. Therefore, the electrical connection interface is also provided with the low-voltage section, allowing a supply voltage for example of about 12 V, in order to be able to supply power to the temperature sensor without overloading it. Connection by way of the connection wiring on an external face of the cover plate of the electrical connection interface, disposed away from the heating body, involves passage of the wiring some distance from the heating body and on the outside of the electrical connection interface, this making the mounting of the electric radiator in a casing of a ventilating, heating and/or air conditioning system with connection wiring extending on the outside of this casing particularly conducive.

The invention also covers a ventilating, heating and/or air conditioning system of a vehicle, comprising a casing and an electric radiator as mentioned above and able to be housed in said casing, in which the casing is provided with at least one air circulation duct across which the heating body of the electric radiator is arranged, said casing having for the one part on a first wall an opening for inserting the heating body into a housing, and for the other part a notch formed separately from the opening defining the housing and sized so as to receive the temperature measuring device.

The casing has at least one air inlet and a plurality of air outlets. The at least one air circulation duct is disposed within the casing, the function of which air circulation duct is to distribute the air flow coming from the air inlet toward each of the air outlets, the latter each leading into an area of the passenger compartment of the vehicle. The electric radiator is disposed across one of the air circulation ducts. The air flow passing through the latter is therefore able to be heated by the heating body of the radiator. The air circulation duct comprising the radiator therefore makes it possible to distribute a flow of hot air toward the passenger compartment of the vehicle. The casing also comprises flaps for directing the air flow toward one or the other of the air circulation ducts depending on the need, which is determined by a command executed by any occupant of the passenger compartment of the vehicle.

The housing of the casing therefore makes it possible to install the heating body of the radiator across the air circulation duct. The housing has dimensions substantially greater than the dimensions of the heating body of the radiator in order that the latter can be inserted by a rectilinear movement in translation within the housing. The radiator is then held by any fixing means, for example by screwing or by snap-fastening.

As mentioned, the casing also comprises at least one notch formed in one of its walls, separately from the opening which contributes to defining access to the housing of the heating body. "Separately" should be understood to mean that none of the edges delimiting the notch is common with one of the edges which contributes to delimiting, in the first wall, the housing. The notch has dimensions substantially greater than those of a section of the support body for supporting the temperature sensor in order that the latter can be inserted into the casing within the notch. The support body extends in a main direction of transverse extension, across the air circulation duct and parallel to the main plane of extension of the heating body.

According to one characteristic of the invention, a compartmentalizing wall of the casing is arranged facing the outlet face of the heating body, substantially perpendicular to the latter, and the compartmentalizing wall has an additional notch configured to allow the support body to pass. In this context, the casing comprises at least two notches that are aligned transversely and configured for the support body to traverse them, in order to limit a degree of freedom of the support body once the latter has been inserted through the notches, and in particular to avoid the bending of its transverse end which is present in the casing.

According to one characteristic of the invention, the support body is kept in its position through the notches by a fixing means integral with the casing, for example at the transverse end of the support body which is present in the casing.

The air flow passing through the circulation duct then first of all traverses the heating body of the radiator and leaves the latter at a relatively high temperature, and then traverses the temperature measuring device by way of openings in the support body. The temperature sensor, disposed within one of the openings in the support body, is also in contact with the air flow and thus measures the temperature thereof.

According to one characteristic of the invention, the connection wiring extends from the transverse end of the support body to the electrical connection interface, on the outside of the casing. The mounting of the radiator is thus facilitated in that it can be carried out either with the temperature measuring device connected to the electrical connection interface or not. Specifically, it is possible to envisage disposing the heating body in the housing, then independently the temperature measuring device with the support body inserted into the housing through the notch, before connecting the connection wiring integral with the support body at the cover plate of the electrical connection interface. It will be understood that this is especially useful and particularly advantageous for the purpose of changing the temperature sensors in the event of failure, or for a maintenance operation. The temperature measuring device can be removed as a whole without thereby removing the heating body from its housing, this making it possible to avoid for the one part having to reinsert this heating body afterwards and for the other part it being necessary to re-seal the opening once the heating body has been inserted.

According to one characteristic of the invention, the notch is formed in a second wall substantially perpendicular to the first wall in which the opening for inserting the heating body into the housing is formed. Such a configuration makes it possible in particular to provide a transverse arrangement of the temperature measuring device which is substantially perpendicular to the direction in which the heating body is inserted into the housing and substantially perpendicular to the direction of extension of the heating elements in the heating body. It is therefore advantageous for the temperature measuring device to extend facing each of the heating elements of the heating body, in order to be able to detect a temperature representative of the actual temperature of the air flow at the outlet of the heating body.

According to one characteristic of the invention, the temperature measuring device is disposed between the heating body of the radiator and a heat-sensitive element housed in the casing of the system. The heat-sensitive element is subject to the heat of the air flow emanating from the heating body of the radiator and moving toward the air outlets. By way of example, the heat-sensitive element may be a flap, as mentioned previously, which makes it possible to determine the path of the air flow within the casing. If the air flow emanating from the heating body of the radiator is at an excessively high temperature, the latter is at risk of damaging the heat-sensitive element. In order to overcome this problem, the temperature measuring device is disposed between the heating body of the radiator and the heat-sensitive element. Therefore, the temperature of the air flow is monitored by the temperature measuring device before coming into contact with the heat-sensitive element. If an excessively high temperature is detected by the temperature measuring device, the information is directly transmitted to the electrical connection interface of the radiator via the connection wiring, thus decreasing the power of the heating elements in order that the air flow emanates from the heating body of the radiator at a lower temperature. The heat-sensitive element is thus protected from extreme temperatures that can be generated by the radiator.

According to one characteristic of the invention, the temperature measuring device is located at a distance of at least 20 mm from the heating body of the radiator. The air flow, after leaving the heating body of the radiator, naturally falls in temperature before coming into contact with the heat-sensitive element. Disposing the temperature measuring device for example against the radiator results in an overestimation of the temperature of the air flow brought into contact with the heat-sensitive element. In other words, such a disposition would lead to an estimation of the temperature of the heating element and not of the air flow at the outlet of the heating body. Ideally, the temperature measuring device is therefore disposed as close as possible to the heat-sensitive element, the aim being to protect the latter from extreme temperatures. In order to obtain relevant measurements, it has been estimated that the temperature measuring device should be disposed at least 20 mm from the heating body of the radiator.

Figure 2:
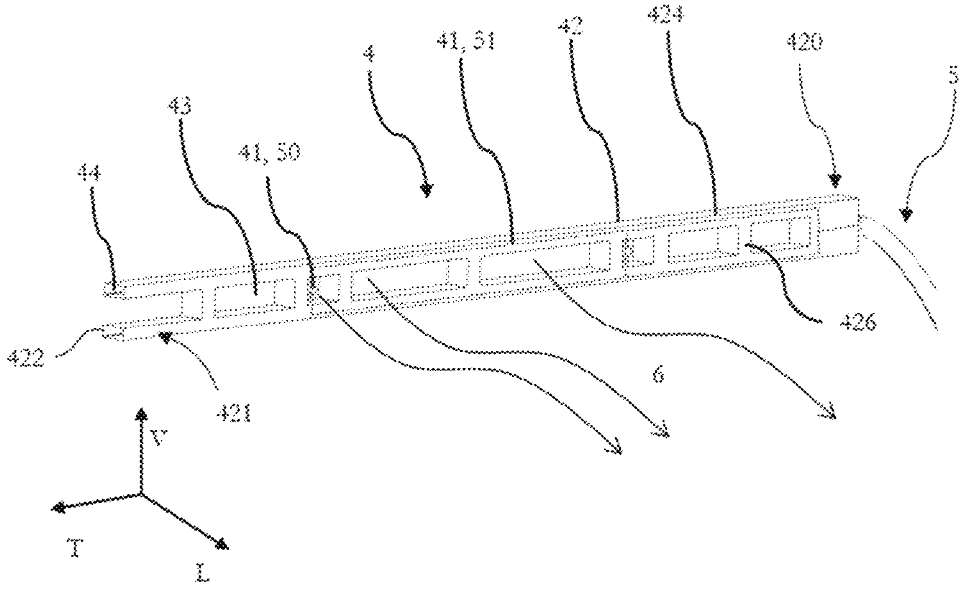
Figure 3:
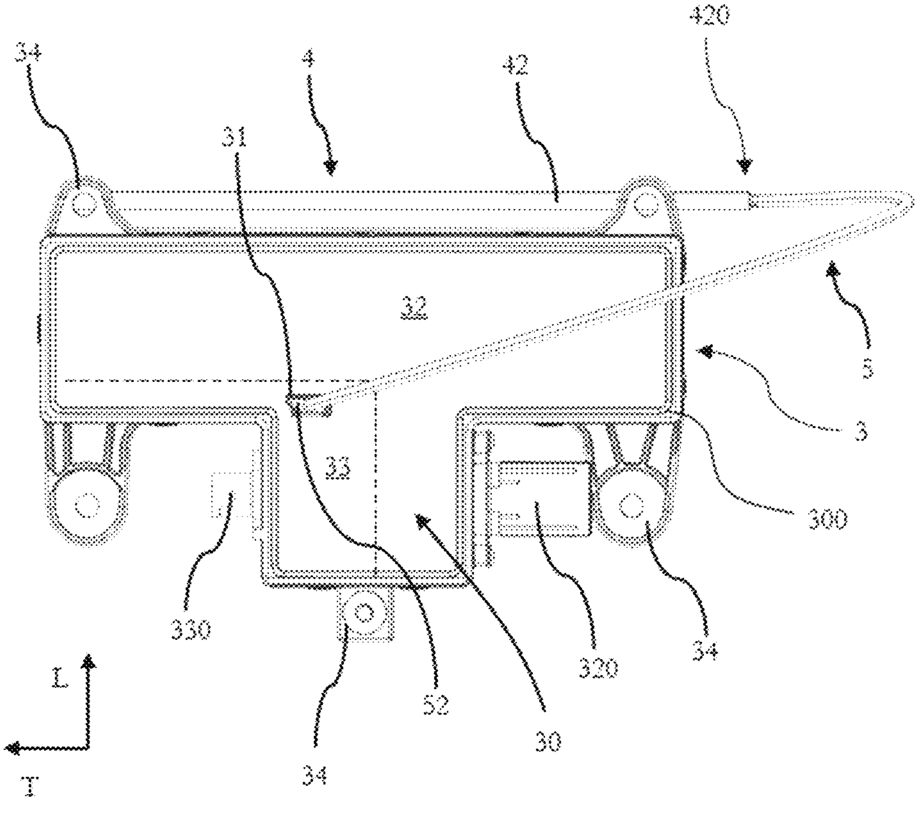
Figure 4:
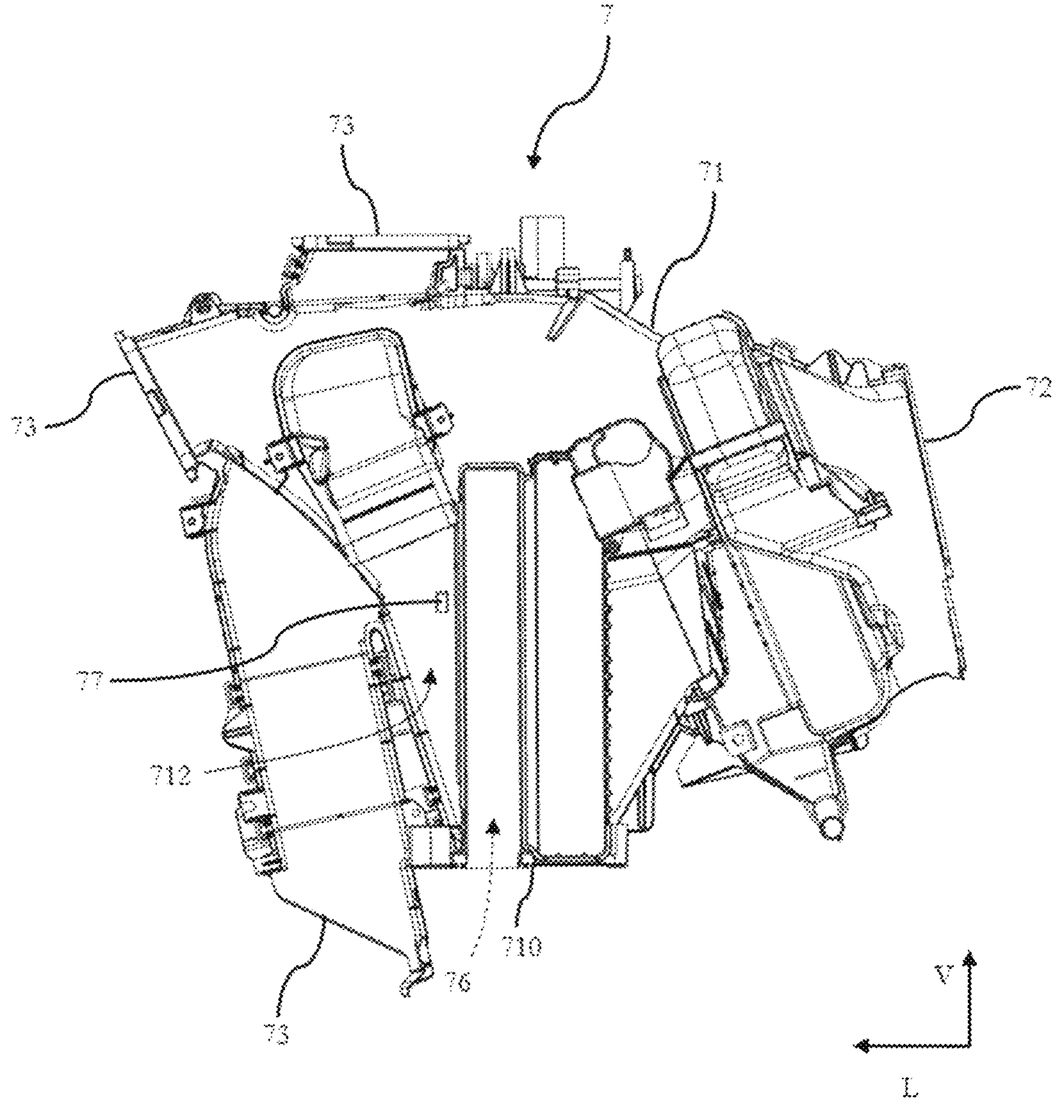
Figure 5:
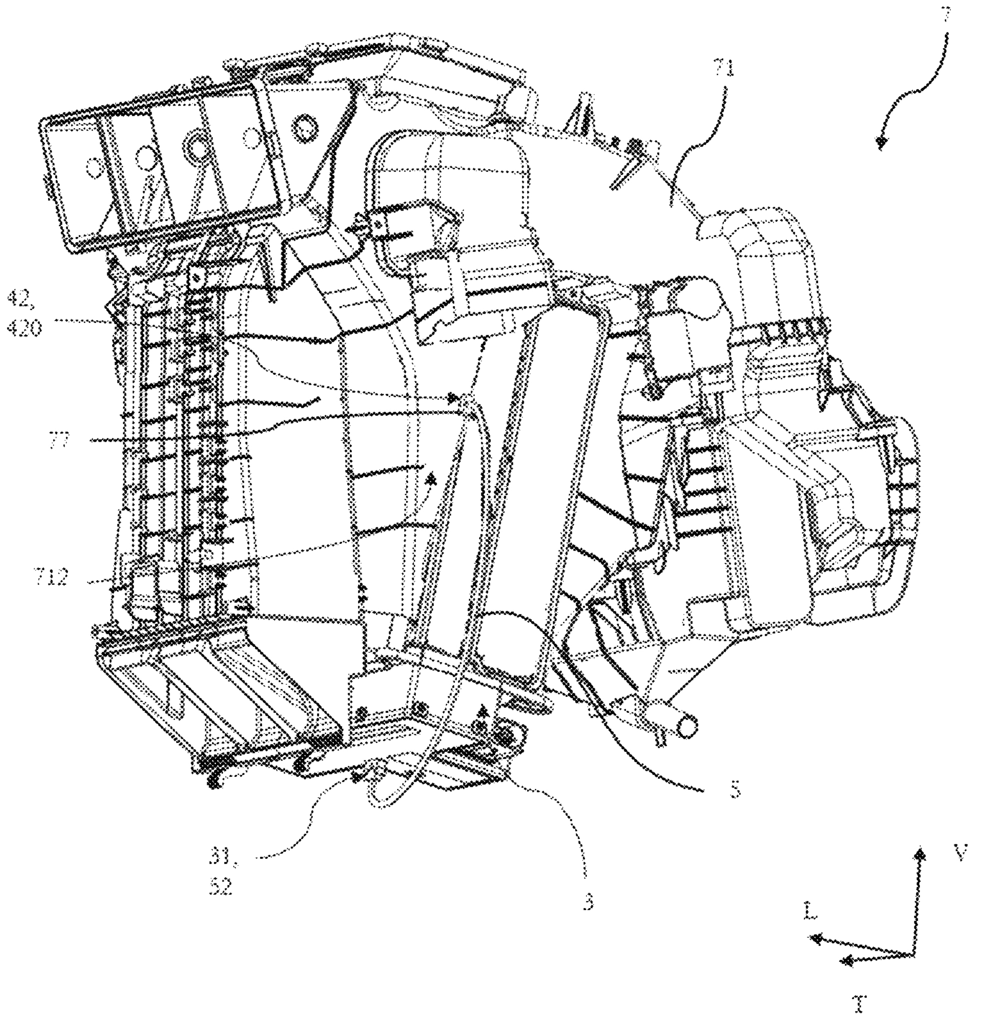
Figure 6:
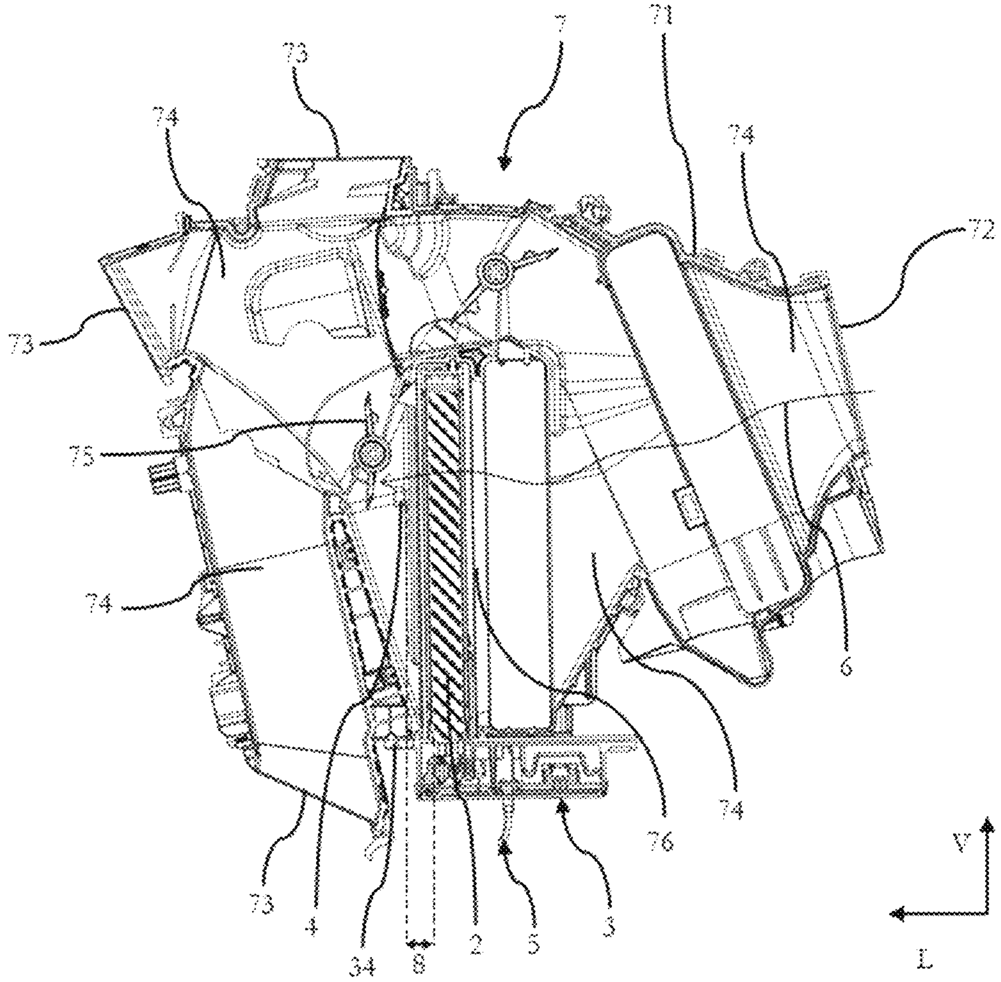

Further characteristics and advantages of the invention will become more clearly apparent from the following description, on the one hand, and from a plurality of exemplary embodiments, which are provided by way of nonlimiting indication with reference to the accompanying schematic drawings, on the other hand, in which drawings:

FIG. 1 is a general view of an electric radiator according to the invention, showing in particular a heating body and a temperature measuring device arranged some distance from this heating body, FIG. 2 is a partial view of the temperature measuring device of FIG. 1, FIG. 3 is a top view of the electric radiator of FIG. 1, showing in particular a connection between an electrical connection interface of the electric radiator and connection wiring of the temperature measuring device, FIG. 4 is a front view of a casing of a ventilating, heating and/or air conditioning system of a vehicle that is able to be equipped with an electric radiator, which is not shown here, FIG. 5 is a perspective view of the casing of FIG. 4, this time equipped with an electric radiator according to FIG. 1, showing in particular the disposition of the connection wiring on the outside of the casing, FIG. 6 is a view in section of the ventilating, heating and/or air conditioning system comprising the electric radiator.

In these figures, the trihedron L, V, T illustrated arbitrarily defines an orientation of the radiator according to the invention in which the vertical direction V corresponds to an axis along which extends the main dimension of the radiator, the longitudinal direction L corresponds to an axis parallel to the main direction of the air flow emanating from the radiator, and the transverse direction T corresponds to an axis perpendicular to the vertical direction V and the longitudinal direction L, it being possible for this transverse direction T to correspond furthermore to the main direction of extension of the temperature measuring device forming part of the invention as will be described in more detail below. It should be noted that such an arbitrary orientation is independent of the orientation of the radiator in the vehicle.

FIG. 1 shows an electric radiator 1 according to the invention, configured to be disposed in a casing of a ventilating, heating and/or air conditioning system and to be traversed by an air flow 6 circulating in this casing in a direction substantially parallel to the longitudinal axis L. The radiator 1 comprises a heating body 2 and an electrical connection interface 3 to which the heating body is fixed.

The heating body 2, in this instance delimited by a frame 21, has a rectangular overall shape extending mainly in a plane of extension defined by a vertical axis V, corresponding to the largest dimension of the heating body, and a transverse axis T, the electrical connection interface 3 being arranged at one end, along the vertical axis V, of the heating body.

The heating body is configured, in this instance by way of the dimension of the frame 21, to house heating elements 22 and radiant elements 23 each extending mainly along the vertical axis V.

The heating elements 22 consist in this instance of resistive elements capable of heating up by way of an input of electrical energy provided by the electrical connection interface 3. The air flow 6, by traversing the heating body 2 of the radiator, takes up the heat energy emitted by the heating elements 22, leading to a rise in temperature of the air flow 6 at the outlet of the heating body 2.

The radiant elements 23 can for example be in the form of fins or a corrugated sheet and have the function of increasing the heating surface area that is in contact with the air flow.

In the example illustrated, the faces of the frame 21 via which the air flow 6 passes are closed by a grid 24 ensuring that the heating elements 22 and the radiant elements 23 are held within the heating body. It should be noted that this embodiment is only a non-limiting example of the invention, and that the resistive and radiant elements could form a heating body within the meaning of the invention without a frame or grid.

The heating body 2 is connected to the electrical connection interface 3. More particularly, the frame 21 may be snap-fastened onto a case which forms the base of the electrical connection interface, and each heating element, by way of an electrical connector that is made integral with an electrode of this heating element, may be plugged into a connector arranged on the inside of the electrical connection interface. The electrical connection interface 3, and in particular a control module embedded in this interface, thus makes it possible to supply electrical energy to the heating elements 22 of the heating body 2, if appropriate by varying the supply of power to the heating elements 22 to control the amount of heat energy to be transferred to the air flow traversing the heating body.

The electric radiator 1 has according to a temperature measuring device 4 arranged at the outlet of the heating body 2 to monitor the temperature of the air flow 6 that has been in contact with the radiant elements 23 heated by the heating elements 22 and to be able to avoid overheating of the electric radiator. The temperature measuring device 4 comprises at least one temperature sensor 41, the function of which is to measure the temperature of the air flow 6 leaving the heating body 2, and a support body 42 which extends mainly along the transverse axis T and within which is disposed the at least one temperature sensor 41.

The support body is configured to keep the temperature sensor 41 in position and fix this position relative to the heating body 2 and to the air flow 6, and to be traversed by the air flow so as not to hinder the flow of the air in the heating, ventilating and air conditioning installation casing. To that end, the support body 42 comprises one or more openings 43 which each allow the air flow 6 to pass through, the at least one temperature sensor 41 being arranged at one of these openings 43. The support body 42 may for example be formed of a heat-resistant material so as not to be damaged by the heat of the air flow 6, whether it is the portion of the air flow made to traverse the support body by the openings 43, or the portion of the air flow made to skim over the support body 42.

Connection wiring 5 is disposed in the continuation of a transverse end 420 of the support body 42 of the temperature measuring device 4. The connection wiring 5 makes it possible to supply electrical power to each temperature sensor 41 and/or to transmit to the electrical connection interface the temperature measurements taken by each of the temperature sensors, the electrical connection interface being configured to modulate the control of and/or supply of electrical power to the heating elements 22 of the heating body 2 depending on the temperature measurements received.

A free end of the connection wiring 5, that is to say the opposite end to the support body 42, is provided with an electrical connection plug 52 configured to be able to be connected to the electrical connection interface 3. More particularly, it is notable that the connection wiring 5 is arranged between the temperature sensor 41 and a low-voltage connector 31 of the electrical connection interface 3, whereas the heating elements are linked to a high-voltage power supply present in this same electrical connection interface. It is thus possible to define, as illustrated in FIG. 3, a high-voltage section 32 and a low-voltage section 33 in the electrical connection interface 3.

FIG. 2 shows the temperature measuring device 4 in part. For reasons of clarity, the heating body does not appear in the background of FIG. 2, but the air flow 6 is still shown.

As mentioned above, the temperature measuring device 4 has at least one temperature sensor 41, in this instance two temperature sensors, for measuring the temperature of the air flow 6 in two different areas of the heating body. Providing a plurality of temperature sensors 41 evenly distributed along the support body 42 makes it possible to provide a more meaningful temperature of the air flow 6, for example via calculation of an average of the temperatures taken.

The openings 43 in the support body are shown here with a rectangular overall shape, the dimensions of which can vary. A distinction is thus made between first openings with dimensions smaller than the dimensions of second openings, the function of the first openings being to house and hold the temperature sensors 41 whereas the function of the second openings, having a larger dimension, is only to make the support more lightweight and to allow free circulation of the air flow 6 through the support body 42 without creating any pressure drop in the air flow that has to circulate in the heating, ventilating and air conditioning installation.

In FIG. 2, a transverse end of the support body 42, opposite to the transverse end 420 mentioned above and in line with the connection wiring 5, is deliberately truncated in order to be able to observe the internal structure of the support body 42. Therefore, it is possible to see that the support body 42 in this instance has a base 421 and a cover 422 which are fitted against one another so as to form a hollow body.

More specifically, the support body has two transverse bars 424 connected to one another by vertical uprights 426, the spacing between two neighboring vertical uprights and between the two transverse bars making it possible to dimension the openings 43 described above. In this way, each transverse bar 424 defines within it, by way of the hollow body formed by the interaction of the base 421 and the cover 422, a channel 44, which in this way is disposed in a portion of the support body 42 which does not have any openings 43.

The temperature sensors 41 each comprise a sensor head 50, housed in the center of one of the openings 43, and a set of connection wires 51 for electrically connecting the sensors and transmitting the measurements taken by these sensors. The sets of connection wires 51 are shown in dotted lines in FIG. 2 and it is notable that these sets of connection wires extend mainly along a transverse axis T along each channel 44. Each temperature sensor 41 is thus kept in position in its opening 43 by tension in the sets of connection wires arranged in the channels disposed on either side of this opening. As illustrated, the connection wires 51 are brought together at the transverse end 420 of the support body 42 to be grouped together in a sheath forming the connection wiring 5.

In order to dispose the temperature sensors 41 and the network of connection wires 51 within the support body 42, the temperature sensors 41 and the connection wires 51 are installed in the base of the support body and the cover plate is then fitted so as to trap the connection wires and thus fix the position of the temperature sensors.

FIG. 3 shows particularly clearly the electrical connection interface 3 and the support body 42 of the temperature measuring device. As has been mentioned above, the connection interface 3 is divided between a high-voltage section 32 and a low-voltage section 33.

The high-voltage section 32 is able to supply the heating elements with a voltage of about 400 V, for example. To that end, a mains connector 320 is provided in a return section 30 of the electrical connection interface which extends some distance from an area facing the heating elements.

The separation between the high-voltage section 32 and the low-voltage section 33 is shown in dotted lines. In order to supply power to the heating elements, the high-voltage section 32 is arranged mainly facing the heating body of the radiator, and therefore the heating elements, and the low-voltage section is mainly disposed in the return section 30 mentioned above.

The low-voltage section 33 of the electrical connection interface 3 is configured to allow the supply of power to electrical components which are not the heating elements and are able to operate at low voltage. As illustrated, there is located in particular in this low-voltage section 33 the low-voltage connector 31 which was mentioned above and is configured to receive the electrical connection plug 52 of the connection wiring 5 in order to connect the temperature measuring device 4 to the electrical connection interface 3. A mains connector 330 emerges from the low-voltage section 33 for example for connection to an electric generator and for the supply of power to this low-voltage section at a current with a voltage of about 12 V.

The low-voltage connector 31, configured to receive the electrical connection plug 52 of the connection wiring 5, is arranged through a cover plate 300 of the electrical connection interface 3, and the electrical connection plug 52 is plugged into the connector facing an outer face of this cover plate, opposite to the electrical components housed in the connection interface, that is to say in other words via the outside of the electrical connection interface. As a result, the connection wiring 5 extends on the outside of the heating body and the electrical connection interface.

The connection interface 3 moreover comprises a plurality of fixing orifices 34 ensuring the fixing of the radiator, for example by screwing, as will be shown below.

A description will now be given, with reference to FIGS. 4 to 6, of a ventilating, heating and/or air conditioning system 7, able to emit an air flow at variable temperature depending on the needs of the vehicle or of its occupants, and configured to have an electric radiator as described above.

The ventilating, heating and/or air conditioning system 7 has a casing 71 which exhibits any shape and is able to conduct the air flow as will be described below. The casing 71 comprises at least one air inlet 72 and a plurality of air outlets 73. The air flow enters the casing 71 through the air inlet 72, for example under the effect of the movement of the vehicle, and then circulates within the casing 71 as far as one of the air outlets 73. Each of the air outlets 73 is connected to ducts, each leading into a different area of the passenger compartment of the vehicle and the air flow is directed toward one and/or the other of these air outlets depending on the area that needs to be ventilated, heated or cooled.

The casing 71 also comprises a housing 76, configured to receive the heating body of the electric radiator. Therefore, the housing 76 has substantially larger dimensions than the heating body. The housing 76 is formed from a first wall 710 delimiting the casing 71, in this instance vertically. The heating body of the radiator is inserted within the housing 76 by a movement in translation along the vertical axis V. Once the radiator is installed, the heating body is arranged within the casing, across a passage of the air flow so as to allow it to be heated, and the electrical connection interface 3 is disposed on the outside of the casing, bearing against an outer face of a wall delimiting the casing. The radiator is subsequently kept in this position, for example by virtue of the fixing orifices 34 in the electrical connection interface 3, through which a fixing means, such as a screw, is fitted in the casing.

Close to the housing 76, the casing 71 comprises a notch 77, formed in a second wall 712 which also contributes to delimiting the shell of the casing, the second wall 712 being substantially perpendicular to the first wall. The notch 77 has dimensions substantially greater than the dimensions of the support body 42 of the temperature measuring device 4 in order that the latter can be slid through the notch 77 by a movement in translation along the transverse axis.

FIGS. 5 and 6 illustrate the casing 71 of the ventilating, heating and/or air conditioning system 7, this time equipped with the electric radiator. It should be noted that the configuration of the temperature measuring device according to one aspect of the invention makes it possible to electrically connect the temperature sensors, housed inside the casing facing an air outlet face of the heating body of the electric radiator, to the low-voltage section of the electrical connection interface, via the outside of the casing. Therefore, advantageously, the sealing of the casing in the area of the radiator and of the temperature measuring device is ensured for the one part by a seal ring arranged around the periphery of the electrical connection interface at the first wall 710, around the periphery delimiting the inlet of the housing 76, and for the other part by a seal ring arranged on the second wall 712 at the notch 77. This sealing is particularly simple to implement, without the connection wiring adversely affecting the effectiveness of the seal rings, and without it being necessary to provide a sealing element specific to the passage of the connection wiring. It will be understood that if the connection wiring were to extend along the heating body, with a temperature measuring device inserted in the same housing as that of the heating body, the presence of the connection wiring would be a problem in the management of the sealing. In the present invention, the fact that the connection wiring is arranged at a transverse end of the support body is combined with a transverse disposition of the temperature measuring device some distance from the heating body, and in a separate area of the housing receiving the heating body, this making it easier to manage the sealing.

FIG. 6 shows in particular, by way of a view in section, this ventilating, heating and/or air conditioning system 7 equipped with the temperature measuring device. As mentioned above, the heating body 2 is disposed within the housing, in a vertical direction of insertion in this instance, and the temperature measuring device 4 is for its part slid through the notch in a perpendicular, in this instance transverse, direction.

The temperature measuring device 4 is inserted into the casing 71, by way of the notch 77, by initially inserting the transverse end without the connection wiring 5. The presence of the connection wiring 5 in the continuation of the transverse end 420 of the support body makes it possible to insert the temperature measuring device 4 within the notch without the connection wiring 5 interfering from a mechanical perspective. Once the temperature measuring device 4 is in place, the transverse end 420 of the support comprising the connection wiring 5 remains outside the casing 71.

The temperature measuring device is kept in place in the casing in particular by the edges delimiting the notch 77, and if appropriate by fixing means, which are not shown here, allowing the transverse end of the support body to be held within the notch. Furthermore, the casing 71 may have compartmentalizing walls which extend substantially perpendicularly to the heating body when the latter is disposed in the casing and which make it possible to divide the air circulation ducts in two so as to facilitate the distribution of the air flow toward a given outlet nozzle 73. In this context, at least one compartmentalizing wall 700 may have an additional notch 770, disposed in the transverse alignment of the notch 77, so as to be traversed by the temperature measuring device and so as to form a support for the latter to avoid bending of the support body.

Once the temperature measuring device 4 has been inserted into the casing of the heating, ventilating and air conditioning installation, the support body 42 of the temperature measuring device is disposed facing the heating body 2, in a similar configuration to that shown in FIG. 1. The heating body 2 and the temperature measuring device 4 are separated by a distance 8 from each other, the distance 8 being measured substantially along the longitudinal axis of circulation of the air flow 6. Ideally, the distance 8 is at least 20 mm, in order to obtain meaningful temperature measurements; if the heating body 2 and the temperature measuring device 4 are too close, incorrect measurements can result.

It is possible to observe in FIG. 6 that the casing 71 comprises a plurality of air circulation ducts 74 within which the air flow 6 is able to circulate. The casing 71 also comprises at least one heat-sensitive element 75, which is likely to be damaged if the surrounding temperature is too high. In the example illustrated, the heat-sensitive element 75 is a flap able to pivot between an open position, visible in FIG. 6, in which the flap allows the passage of the air flow 6 through the air circulation duct 74 in which the electric radiator is arranged, and a closed position of this air circulation duct which tends to force the passage of the air flow in a duct without an electric radiator.

In the configuration shown in FIG. 6, the air flow 6 sweeps through the air inlet 72, circulates in the air circulation duct 74 equipped with the electric radiator 1 and traverses the heating body 2. When the electric radiator is in operation, the air flow 6 emerges from the heating body 2 at high temperature. The air flow 6 then traverses the temperature measuring device 4 and then comes into contact with the heat-sensitive element 75. If the air flow 6 is too hot, it is likely to damage the heat-sensitive element 75. In order to prevent such damage, and in order to prevent, where appropriate, overheating during operation of the heating elements of the heating body, the temperature measuring device 4 is disposed at the outlet of the heating body, by being interposed between the heating body 2 and the heat-sensitive element 75. Therefore, the temperature of the air flow 6 at the outlet of the heating body is checked by the temperature measuring device 4, this temperature being representative of the temperature of the air flow when it comes into contact with the heat-sensitive element 75. It will be understood that when the temperature of the air flow 6 is estimated to be too high for the heat-sensitive element 75, that is to say it exceeds a predefined threshold, the temperature measuring device 4 is able to send data to the electrical connection interface 3 by way of the connection wiring 5 such that the electrical connection interface 3 acts on the supply of power to and operation of the heating elements of the heating body 2 in order to reduce the heating. The air flow 6 thus emerges from the heating body 2 at a lower temperature, which protects the heat-sensitive element 75.

Of course, the invention is not limited to the examples that have just been described, and numerous modifications may be made to these examples without departing from the scope of the invention.

The invention as has just been described successfully achieves the aim it had set itself, and makes it possible to propose an electric radiator which has a temperature sensor that is able to be disposed some distance from the heating body, in order to better measure the temperature of the air flow at the outlet of the heating body, and which can be installed in the casing of a heating, ventilating and air conditioning system without any sealing problems. Variants not described here could be implemented without departing from the context of the invention, since, in accordance with the invention, they comprise a support body continued at one transverse end by connection wiring able to be connected to the heating body, and in particular to a low-voltage section, via the outside of the casing, in accordance with the invention.

The invention claimed is:

1. An electric radiator configured to be disposed in a casing of a ventilating, heating and/or air conditioning system of a vehicle, comprising:
- a heating body, comprising:
  - heating elements,
  - radiant elements formed of fins or a corrugated sheet, and
  - a frame that houses the heating elements and the radiant elements;
- an electrical connection interface fixed at one end of the frame;
- at least one temperature measuring device, comprising:
  - at least one temperature sensor configured to measure a temperature of an air flow leaving the heating body and a support body configured to support the temperature sensor, wherein the support body comprises:

two transverse bars connected to one another by vertical uprights and openings formed between neighboring vertical uprights and the transverse bars, wherein the temperature sensor is configured to be arranged at one of the openings; and a connection wiring, wherein the temperature measuring device is located at a distance of at least 20 mm from the heating body and is disposed facing an outlet face of the heating body.

2. The electric radiator as claimed in claim 1, wherein the at least one temperature sensor has a sensor head housed in the support body and connection wires which link the sensor head to the connection wiring by extending along channels formed in the support body.

3. The electric radiator as claimed in claim 2, wherein the temperature measuring device comprises a plurality of temperature sensors, the connection wires specific to each temperature sensor being grouped together to form the connection wiring at an end of the support body.

4. The electric radiator as claimed in claim 2, wherein the support body for supporting the temperature sensor has a plurality of openings made between the two transverse bars and uprights linking the two transverse bars to one another, said openings making it possible to house the sensor head of the at least one temperature sensor and/or allowing a passage of the air flow traversing the heating body of the radiator.

5. The electric radiator as claimed in claim 1, wherein the connection wiring is electrically linked to a low-voltage connector of the electrical connection interface, said connector being arranged on an external face of a cover plate of the electrical connection interface.

6. The electric radiator as claimed in claim 1, wherein the electrical connection interface includes a high-voltage section for powering the heating elements and a low-voltage section for connecting the temperature sensor.

7. A ventilating, heating and/or air conditioning system of a vehicle, comprising a casing and an electric radiator as claimed in claim 1 that is able to be housed in said casing, wherein the casing is provided with at least one air circulation duct across which the heating body of the electric radiator is arranged, said casing having for one part on a first wall an opening for inserting the heating body into a housing, and for another part a notch formed separately from the opening defining the housing and sized so as to receive the temperature measuring device.

8. The ventilating, heating and/or air conditioning system as claimed in claim 7, wherein the connection wiring extends from an end of the support body to the electrical connection interface, on an outside of the casing.

9. The ventilating, heating and/or air conditioning system as claimed in claim 7, wherein the notch is formed in a second wall substantially perpendicular to the first wall in which the opening for inserting the heating body into the housing is formed.

10. The ventilating, heating and/or air conditioning system as claimed in claim 7, wherein the temperature measuring device is disposed between the heating body of the radiator and a heat-sensitive element housed in the casing of the system.

* * * * *